(12) United States Patent
Zamponi (10) Patent No.: US 11,807,354 B2
(45) Date of Patent: Nov. 7, 2023

(54) GEARBOX AND ASSOCIATED AIRCRAFT (71) Applicant: AIRBUS HELICOPTERS, Marignane (FR)

(72) Inventor: Laurent Zamponi, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/945,276

(22) Filed: Sep. 15, 2022

(65) Prior Publication Data

US 2023/0121921 A1    Apr. 20, 2023

(30) Foreign Application Priority Data

Oct. 18, 2021   (FR) ...................................... 2111006

(51) Int. Cl.
*B64C 11/32* (2006.01)
*B64C 27/12* (2006.01)
*F16C 19/18* (2006.01)
*B64C 27/59* (2006.01)
*F16C 19/52* (2006.01)
*F16C 19/54* (2006.01)
*F16C 33/58* (2006.01)
*F16C 33/60* (2006.01)

(52) U.S. Cl.
CPC .............. *B64C 11/32* (2013.01); *B64C 27/12* (2013.01); *B64C 27/59* (2013.01); *F16C 19/18* (2013.01); *F16C 19/184* (2013.01); *F16C 19/52* (2013.01); *F16C 19/542* (2013.01); *F16C 33/585* (2013.01); *F16C 33/60* (2013.01); *F16C 2326/43* (2013.01)

(58) Field of Classification Search
None
See application file for complete search history.

(56) References Cited

U.S. PATENT DOCUMENTS 9,829,037 B2 * 11/2017 Gallimore ............... F16C 19/54
2010/0215307 A1 * 8/2010 Loeschner .............. F16C 19/49
384/571

(Continued)

FOREIGN PATENT DOCUMENTS

| EP | 3587845 A1 | 1/2020 |
| EP | 3753849 A1 | 12/2020 |
| EP | 3753850 A1 | 12/2020 |

(Continued)

OTHER PUBLICATIONS

Desombre D G B—FR-3095481-A1 + machine translation (Year: 2020).*

(Continued)

*Primary Examiner* — Juan G Flores
(74) *Attorney, Agent, or Firm* — BROOKS KUSHMAN P.C.

(57) ABSTRACT

A gearbox including an angular contact ball bearing comprising a first row of balls provided with a plurality of balls, a second row of balls provided with another plurality of balls, at least one inner ring and at least one outer ring. According to the invention, in a degraded operating mode of the bearing, the first row of balls is configured to transmit at least one first axial force oriented along a first axis and at least one second axial force oriented along a second axis opposite the first axis, the second row of balls transmitting no axial force.

9 Claims, 4 Drawing Sheets

(56) References Cited

U.S. PATENT DOCUMENTS

2016/0160911 A1* 6/2016 Gallimore ............. F01D 25/164
 384/448
2022/0073201 A1* 3/2022 Podda ................. B64C 29/0033

FOREIGN PATENT DOCUMENTS

EP 3757000 A1 12/2020
FR 3095481 A1 10/2020

OTHER PUBLICATIONS

French Search Report for French Application No. FR2111006, Completed by the French Patent Office, dated May 16, 2022, 11 pages.

* cited by examiner

GEARBOX AND ASSOCIATED AIRCRAFT

CROSS-REFERENCE TO RELATED APPLICATIONS

This application claims priority to French patent application No. FR 21 11006 filed on Oct. 18, 2021, the disclosure of which is incorporated in its entirety by reference herein.

TECHNICAL FIELD

The present invention relates to the field of gearboxes equipped with bearings, aircraft equipped with such gearboxes, and power transmission methods.

BACKGROUND

More particularly, the invention relates to gearboxes including rotational guide members for guiding rotatable elements of a rotorcraft rotor, such guide members also allowing the transmission of axial forces, for example in order to control a pitch of the blades of this rotor, such as a rear rotor.

These guide members are further subjected to considerable axial stresses in two opposing senses of a direction coinciding with an axis of rotation of the rotatable parts. Such stresses may thus lead to degradation or wear at raceways of these guide members.

Moreover, in the field of aircraft, it may be advantageous to detect or measure a level of wear or degradation of such a guide member in order to generate an alarm and replace the damaged guide member before it loses its function.

Generally, such guide members are in the form of ball and/or roller bearings as described in documents EP 3 587 845, EP 3 757 000, EP 3 753 850 and EP 3 753 849.

Document EP 3 587 845 describes the redundant use of two angular contact ball bearings arranged next to each other so that, if one of the two bearings becomes degraded, the other bearing is still operational. Such a system also comprises a connecting part for transmitting forces to one or the other of the two angular contact ball bearings. In a known manner, each angular contact ball bearing comprises two rows of balls arranged coaxially next to each other.

Moreover, such a system comprises many components and is complex to manufacture. This system may also generate significant heat dissipation in a very confined area that is difficult to lubricate.

Documents EP 3 753 849 and EP 3 753 850 disclose double-row angular contact ball bearings combined with a double-row tapered roller thrust bearing for transmitting axial forces along two opposing axes.

Such a system is also provided with a large number of moving components and may possibly be complex to produce and lubricate.

This can result in significant heating and degradation due to slippage.

Document EP 3 757 000 describes a first double-row angular contact ball bearing combined coaxially with a second double-row tapered roller bearing.

A wear detection system comprising a sacrificial component and a movable component makes it possible to mechanically control the shift of rotational guiding from the first bearing to the second bearing. Such a system may therefore also be complex to manufacture and to install in a gearbox.

Moreover, document FR 3 095 481 describes a double-row angular contact ball bearing equipping a turbomachine bearing. This bearing can operate according to two operating modes, namely a normal mode and a degraded mode.

In the degraded operating mode, a first row of balls does not prevent the relative axial movement of the inner and outer rings of the bearing in a first sense if the bearing is subjected to an axial force tending to move the inner and outer rings axially in relation to each other in the first sense. Third raceways are arranged on each of the inner and outer rings and configured such that a second row of balls comes into contact with the third raceways in order to limit a relative axial movement of the inner and outer rings in the first sense.

SUMMARY

The object of the present invention is therefore to propose a gearbox including a ball bearing with a compact and simplified design that helps overcome the above-mentioned limitations.

The invention therefore relates to a gearbox configured to transmit an engine torque to at least one rotor provided with blades.

According to the invention, such gearbox includes:

an angular contact ball bearing comprising a first row of balls provided with a plurality of balls, and a second row of balls provided with another plurality of balls, and a pitch control rod integral in translation with at least one receiving ring of the ball bearing.

Moreover, in a nominal operating mode of the bearing:

the first row of balls transmits at least one first axial force oriented along a first axis from at least one transmitting ring to at least one receiving ring of the ball bearing; and the second row of balls transmits at least one second axial force oriented along a second axis, opposite the first axis, from the at least one transmitting ring to the at least one receiving ring.

Furthermore, in a degraded operating mode of the bearing, the first row of balls is configured to transmit the at least one first axial force oriented along the first axis and the at least one second axial force oriented along the second axis, the second row of balls transmitting no axial force, the degraded operating mode corresponding to a degradation of at least one raceway of the at least one transmitting ring or of the at least one receiving ring initially coming into contact with the other plurality of balls of the second row of balls in the nominal operating mode.

In other words, when the second row of balls no longer allows a second axial force to be transmitted along the second axis following wear or degradation, the first row of balls allows this second axial force to be transmitted.

The bearing thus comprises at least one additional raceway arranged on the at least one transmitting ring of the bearing. This additional raceway forms another angular contact at the first row of balls in order to transmit forces only along the second axis by means of the at least one transmitting ring and the at least one receiving ring and in the degraded operating mode. In other words, the bearing can transmit axial forces in two opposing senses and, in the degraded operating mode, the first row of balls then has four points of contact, namely two points of contact with the at least one transmitting ring and two points of contact with the at least one receiving ring. Moreover, the operating clearance of the bearing is then greatly increased in this degraded operating mode.

Furthermore, the at least one transmitting ring may be formed by at least one inner ring of the bearing. In this case, the at least one receiving ring is then formed by at least one outer ring covering the balls and the inner ring or rings of the bearing.

Alternatively, the at least one receiving ring may be formed by at least one inner ring. In this case, the at least one transmitting ring is then formed by at least one outer ring of the bearing covering the balls and the inner ring or rings of the bearing.

Such a bearing makes it possible to produce a gearbox and an associated aircraft with few moving parts and a lubrication system that is simple to implement. Moreover, in a nominal operating mode of the bearing, all the rolling elements help guide the moving members in rotation and, as a result, the heat dissipation of such a bearing is minimal.

Moreover, to either side of a first transverse plane passing through centers of the balls of the first row of balls, the at least one transmitting ring comprises a first main transmitting raceway in contact with the plurality of balls of the first row of balls in the nominal operating mode and a first secondary transmitting raceway, the first secondary transmitting raceway being separated from the first row of balls by a first predetermined non-zero operating clearance in the nominal operating mode, the first secondary transmitting raceway being in contact with the plurality of balls of the first row of balls in the degraded operating mode when the at least one transmitting ring is loaded by the at least one second axial force oriented along the second axis.

In other words, the additional raceway in contact with the first row of balls is formed by the first secondary transmitting raceway. A new angular contact is then formed, if necessary, with the balls of the first row and a secondary receiving raceway of the receiving ring. The first predetermined operating clearance therefore prevents the transmission of a second axial force along the second axis in the first row of balls as long as the bearing is operating in the nominal operating mode. Thus, in this nominal operating mode, the first predetermined operating clearance ensures there is no contact between the first secondary transmitting raceway and the balls of the first row, even taking into account deformations of the bearing under load, if required.

Moreover, such a first predetermined operating clearance allows the balls of the degrading second row to be loaded for a sufficiently long time by axial forces for it to continue its degradation and allow this degradation to be detected with a monitoring system comprising, for example, a detector for detecting metal particles or chips in suspension in a lubricating fluid.

Such an additional raceway formed by the first secondary transmitting raceway is thus activated only after a raceway in contact with the balls of the second row reaches an advanced level of degradation.

However, in the degraded operating mode of the bearing and when the transmitting ring is loaded by the at least one second axial force oriented along the second axis, the first secondary transmitting raceway comes into contact with the plurality of balls of the first row of balls and thus allows the transmission of a second axial force along the second axis.

Likewise, to either side of a second transverse plane passing through centers of the balls of the second row of balls, the at least one transmitting ring comprises a second main transmitting raceway in contact with the plurality of balls of the second row of balls in the nominal operating mode and a second secondary transmitting raceway, the second secondary transmitting raceway being separated from the second row of balls by a second predetermined non-zero operating clearance in the nominal operating mode, the second secondary transmitting raceway being in contact with the plurality of balls of the second row of balls in the degraded operating mode when the at least one transmitting ring is loaded by the at least one first axial force oriented along the first axis.

Such a second predetermined operating clearance prevents the transmission of a first axial force along the first axis in the second row of balls as long as the bearing is operating in the nominal operating mode.

However, in the degraded operating mode of the bearing and when the transmitting ring is loaded by the at least one first axial force oriented along the first axis, the second secondary transmitting raceway can move along the first axis and come into contact with the plurality of balls of the second row of balls. In this case, the second secondary transmitting raceway allows the transmission of a first axial force along the first axis to a second secondary receiving raceway of the at least one receiving ring.

Each of the two rows of balls can therefore transmit axial forces along the first and second opposing axes by means of the secondary transmitting and receiving raceways if degradation occurs at the main transmitting and/or receiving raceways initially cooperating with the other row of balls in the nominal operating mode.

Futhermore, the first predetermined operating clearance is equal to the second predetermined operating clearance. The first secondary transmitting raceway and the second secondary transmitting raceway are then arranged symmetrically with respect to a median plane of symmetry of the bearing.

Moreover, the first predetermined operating clearance and the second predetermined operating clearance are between 0.1 mm (millimeter) and 0.5 mm (millimeter).

Indeed, such a first predetermined operating clearance therefore allows the switch to the degraded operating mode only after reaching a predetermined level of wear or degradation of at least one second main raceway of the at least one transmitting ring or of the at least one receiving ring initially in contact with the other plurality of balls of the second row of balls in the nominal operating mode.

As a result, not only does the bearing remain active, but it is also possible to detect the wear before the bearing malfunctions, by vibration analysis or by collecting chips, for example.

Such a second predetermined operating clearance allows the switch to the degraded operating mode only after reaching a predetermined level of wear or degradation of at least one first main raceway of the at least one transmitting ring or of the at least one receiving ring initially in contact with the plurality of balls of the first row of balls in the nominal operating mode.

As a result, not only does the bearing remain active, but it is also possible to detect the wear before the bearing malfunctions, by vibration analysis or by collecting chips, for example.

Advantageously, the first secondary transmitting raceway and the second secondary transmitting raceway may by arranged symmetrically with respect to a median plane of symmetry of the bearing.

According to a first embodiment of the invention, the at least one receiving ring may be a unitary component.

In other words, such a receiving ring is a one-piece component and may have both the first main receiving raceway and the first secondary receiving raceway.

In this case, the at least one transmitting ring may comprise a first transmitting ring provided with the first main transmitting raceway and a second transmitting ring provided with the first secondary transmitting raceway.

The first transmitting ring and the second transmitting ring can therefore come into contact with the plurality of balls of the first row of balls in the degraded operating mode.

According to a first variant of the first embodiment of the invention, the at least one transmitting ring comprises only one first transmitting ring and one second transmitting ring. In this case, the first transmitting ring comes into contact with the plurality of balls of the first row of balls in the nominal operating mode and the second transmitting ring can come into contact with the plurality of balls of the first row of balls in the degraded operating mode and with the other plurality of balls of the second row of balls in the nominal operating mode.

According to a second variant of the first embodiment of the invention, the at least one transmitting ring comprising a second main transmitting raceway in contact with the plurality of balls of the second row of balls in the nominal operating mode, the at least one transmitting ring may comprise a first transmitting ring provided with the first main transmitting raceway, a second transmitting ring provided with the first secondary transmitting raceway and a third transmitting ring provided with the second main raceway coming into contact with the other plurality of balls of the second row of balls in the nominal operating mode, the second transmitting ring being provided with the second secondary transmitting raceway.

In this case, in the nominal operating mode, the third transmitting ring is in contact with the balls of the second row of balls in order to transmit a second axial force in the second sense.

However, in the degraded operating mode, the third transmitting ring no longer transmits axial force to the other plurality of balls of the second row of balls. The second transmitting ring comes into contact with the balls of the first row of balls in order to transmit the second axial force in the second sense in the degraded operating mode.

According to a second embodiment of the invention, the at least one transmitting ring may be a unitary component.

In other words, such a transmitting ring is a one-piece component and may have both the first main transmitting raceway and the first secondary transmitting raceway.

In this case, the at least one receiving ring may comprise a first receiving ring provided with the first secondary receiving raceway and a second receiving ring provided with the first main receiving raceway.

According to a first variant of the second embodiment of the invention, the at least one transmitting ring being a unitary component, the at least one receiving ring comprises only one first receiving ring and one second receiving ring. In this case, the first receiving ring can come into contact with the plurality of balls of the first row of balls in the degraded operating mode and the second receiving ring is in contact with the plurality of balls of the first row of balls and with the other plurality of balls of the second row of balls in the nominal operating mode.

According to a second variant of the second embodiment of the invention, the at least one transmitting ring being a unitary component, the at least one receiving ring may comprise a first receiving ring provided with a first secondary receiving raceway, a second receiving ring provided with a first main receiving raceway and a third receiving ring provided with a second secondary receiving raceway, the second receiving ring being provided with a second main receiving raceway.

In this case, in the nominal operating mode and in the degraded operating mode, the third receiving ring may be in contact with the other plurality of balls of the second row of balls but transmits no axial force along the second axis.

In this case, in the degraded operating mode of the first row of balls, the third receiving ring may be in contact with the other plurality of balls of the second row of balls but transmits no axial force along the second axis.

In the nominal operating mode, the second receiving ring is in contact with the other plurality of balls of the second row of balls in order to transmit the second axial force in the second sense.

In the degraded operating mode, the first receiving ring comes into contact with the balls of the first row of balls in order to transmit the second axial force in the second sense.

Thereafter, the invention relates to a gearbox, in particular a gearbox referred to as a rear or auxiliary gearbox of a rotorcraft for transmitting an engine torque to a rear rotor in order to counter a torque transmitted by the rotation of a main rotor to an airframe or in order to control movements about a yaw axis of the rotorcraft.

The invention also relates to an aircraft comprising at least one rotor provided with blades and at least one engine.

According to the invention, the aircraft comprises a gearbox as mentioned above, the gearbox transmitting an engine torque generated by the at least one engine to said at least one rotor, the pitch control rod being mechanically connected to at least one pitch lever controlling the pitch of the blades of the at least one rotor.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION

Elements that are present in more than one of the figures are given the same references in each of them.

As already disclosed, the invention relates to the field of guiding moving parts in rotation, for example moving parts of an aircraft, allowing it to be controlled in the air.

Figure 1:
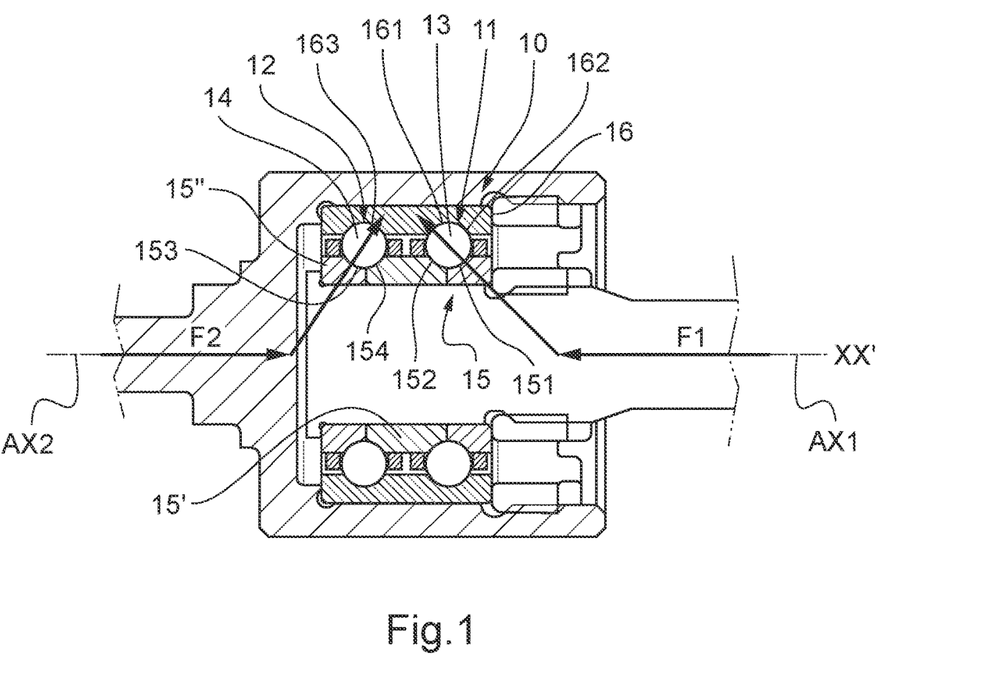
FIG. 1 is a transverse cross-sectional view of a first example of a bearing according to the invention in a nominal operating mode.

As shown in FIG. 1, such guiding may be carried out by means of an angular contact ball bearing 10 comprising a first row 11 of balls provided with a plurality of balls 13 and a second row 12 of balls provided with another plurality of balls 14. Such first and second rows 11, 12 of balls are arranged side by side coaxially along a longitudinal axis of the bearing 10 and are interposed radially around said longitudinal axis between at least one transmitting ring 15, 15', 15" and at least one receiving ring 16.

According to the first example of FIG. 1, the at least one transmitting ring 15, 15', 15" comprises a first transmitting ring 15, a second transmitting ring 15' and a third transmitting ring 15". The at least one receiving ring 16 is formed by a unitary receiving ring 16.

Moreover, the at least one transmitting ring 15, 15', 15" is in this instance represented by at least one inner ring of the bearing 10 but may also be represented by at least one outer ring of a bearing. The term "transmitting" refers to the ability of a ring of the bearing to transmit an axial force to at least one row 11, 12 of balls 13, 14 of the bearing 10.

Similarly, the at least one receiving ring 16 is in this instance represented by at least one outer ring of the bearing 10 but may also be represented by at least one inner ring of a bearing. The term "receiving" refers to the ability of a ring of the bearing to receive an axial force through at least one row 11, 12 of balls 13, 14 of the bearing 10.

As shown, the first and second rows 11, 12 of balls have load centers arranged towards the outside of the bearing 10 and thus form an assembly referred to as an O-assembly. Moreover, such a bearing may also have load centers arranged towards the inside of the bearing and form an assembly referred to as an X-assembly.

The balls 13, 14, the at least one transmitting ring 15, 15', 15" and the at least one receiving ring 16 may be generally formed from a material with a low friction coefficient such as steel or ceramic in order to give the bearing 10 a long service life.

Moreover, in a nominal operating mode of the bearing 10 shown in FIG. 1, the first row 11 of balls allows at least one first axial force F1 oriented along a first axis AX1 to be transmitted from the first transmitting ring 15 to the receiving ring 16 in the case of an O-assembly bearing 10. Such a first axis AX1 is arranged coaxially with an axis of rotation XX' of the ball bearing 10 and is oriented in a first sense from a first lateral face 17 of the at least one transmitting ring 15, 15', 15" to a second lateral face 18 of the at least one transmitting ring 15, 15', 15".

Alternatively, in the case of an X-assembly bearing 10, the second row 12 of balls would allow at least one first axial force F1 oriented along a first axis AX1 to be transmitted from the third transmitting ring 15" to the receiving ring 16.

With continuing reference to this nominal operating mode of the bearing 10, the second row 12 of balls allows at least one second axial force F2 oriented along a second axis AX2, opposite the first axis AX1, to be transmitted from the third inner ring 15" to the outer ring 16 in the case of an O-assembly bearing 10.

Alternatively, in the case of an X-assembly bearing 10, the first row 11 of balls would allow at least one second axial force F2 oriented along a second axis AX2 to be transmitted from the second transmitting ring 15' to the receiving ring 16.

As shown in the case of an O-assembly, the first transmitting ring 15 comprises a first main transmitting raceway 151 in contact with the balls 13 of the first row 11 of balls.

The receiving ring 16 comprises a first main receiving raceway 161 in contact with the balls 13 of the first row 11 of balls.

The balls 13 of the first row 11 of balls therefore allow the first axial force or forces F1 to be transmitted from the first main transmitting raceway 151 to the first main receiving raceway 161.

In this nominal operating mode of the bearing 10, the third receiving ring 15" comprises a second main transmitting raceway 153 coming into contact with the other plurality of balls 14 of the second row 12 of balls.

The receiving ring 16 comprises a second main receiving raceway 163 coming into contact initially with the other plurality of balls 14 of the second row 12 of balls.

The balls 14 of the second row 12 of balls therefore initially allow the second axial force or forces F2 to be transmitted from the second main transmitting raceway 153 to the second main receiving raceway 163.

Figure 2:
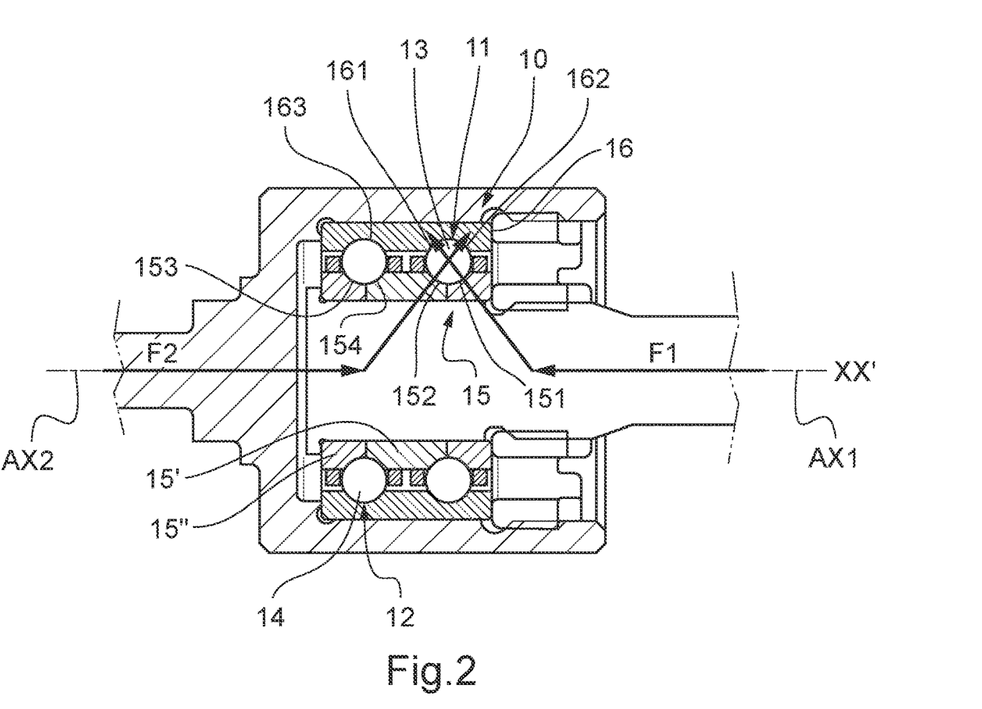
FIG. 2 is a transverse cross-sectional view of the first example of a bearing according to the invention in a degraded operating mode.

In a degraded mode of the bearing 10 shown in FIG. 2, these raceways 153, 163 may become degraded and worn and result in poor rotational guidance of the moving parts and play in the translational control.

Such a bearing 10 is then remarkable in that the first row 11 of balls is configured to transmit the first axial force or forces F1 oriented along the first axis AX1 and the second axial force or forces F2 oriented along the second axis AX2 in the degraded operating mode. In such a degraded operating mode of the bearing 10, the second row 12 of balls no longer transmits or transmits little axial force between the third transmitting ring 15" and the receiving ring 16.

Figure 3:
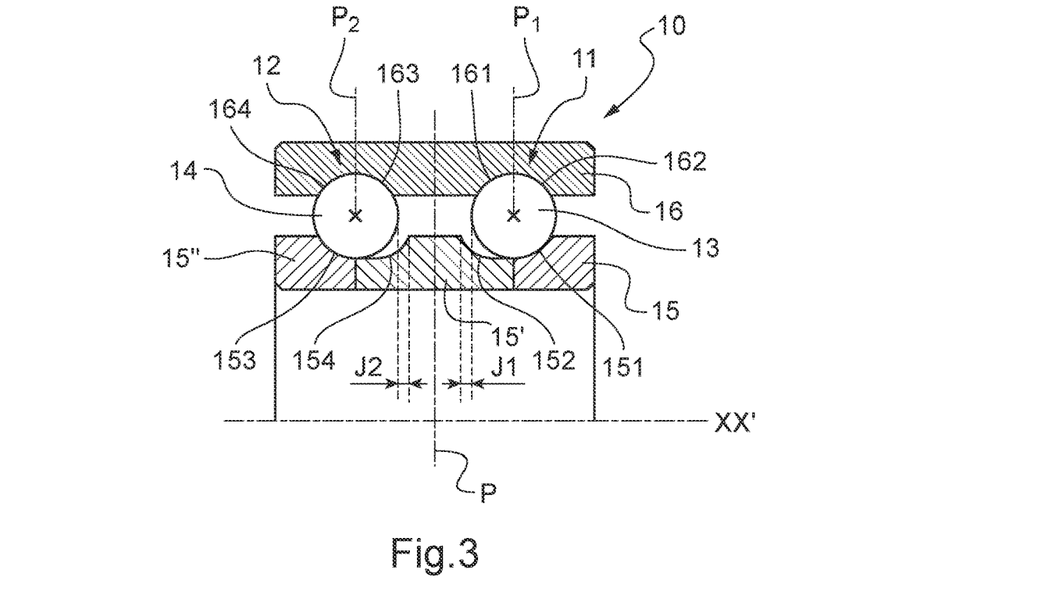
FIG. 3 is a partial cross-sectional view of the first example of a bearing according to the invention.

As shown in FIG. 3, such operation of the first row 11 of balls can be achieved as a result of the presence of a first secondary transmitting raceway 152 on the second transmitting ring 15'. This first secondary transmitting raceway 152 is separated from the balls 13 of the first row 11 of balls by a first predetermined non-zero operating clearance J1 in the nominal operating mode. Moreover, the first main transmitting raceway 151 and the first secondary transmitting raceway 152 are thus arranged to either side of a first transverse plane P1 passing through the centers of the balls 13 of the first row 11 of balls.

However, in the degraded operating mode and when the second transmitting ring 15' is loaded by the second axial force or forces F2 oriented along the second axis AX2, the first secondary transmitting raceway 152 comes into contact with the balls 13 of the first row 11 of balls to transmit the second axial force or forces F2 oriented along the second axis AX2 to the balls 13 and then to the receiving ring 16 via a first secondary receiving raceway 162. The first main receiving raceway 161 and the first secondary receiving raceway 162 are also arranged to either side of the first transverse plane P1 passing through the centers of the balls 13 of the first row 11 of balls.

Moreover, additionally, the bearing 10 may comprise a similar configuration at the second row 12 of balls. This configuration of the second row 12 of balls may thus be obtained as a result of the presence of a second secondary transmitting raceway 154 on the second transmitting ring 15'. This second secondary transmitting raceway 154 is separated from the balls 14 of the second row 12 of balls by a second predetermined non-zero operating clearance J2 in said nominal operating mode.

Moreover, the second main transmitting raceway 153 and the second secondary transmitting raceway 154 are thus arranged to either side of a second transverse plane P2 passing through the centers of the balls 14 of the second row 12 of balls.

Similarly, the first secondary transmitting raceway 152 and the second secondary transmitting raceway 154 may be arranged symmetrically with respect to a median plane of symmetry P of the bearing 10.

On the other hand, in another degraded operating mode similar to the degraded operating mode and when the second transmitting ring 15' is loaded by the first axial force or forces F1 oriented along the first axis AX1, the second secondary transmitting raceway 154 comes into contact with the balls 14 of the second row 12 of balls to transmit the first axial force or forces F1 oriented along the first axis AX1 to the balls 14 and then to the receiving ring 16 via a second secondary receiving raceway 164. The second main receiving raceway 163 and the second secondary receiving raceway 164 are also arranged to either side of the second transverse plane P2 passing through the centers of the balls 14 of the second row 12 of balls.

The first predetermined operating clearance J1 and the second predetermined operating clearance J2 may be equal and between 0.01 mm (millimeter) and 1 mm (millimeter).

Moreover, these first and second operating clearances of the bearing 10 may preferably be between 0.1 mm (millimeter) and 0.5 mm (millimeter) and may, for example, be in the region of 0.3 mm (millimeter).

Therefore, in the degraded operating mode of the bearing 10, each of the first and second rows 11, 12 of balls can be used to transmit axial forces along the two opposing axes AX1 and AX2 if degradation occurs at the raceway arranged opposite the other row of balls.

Figure 4:
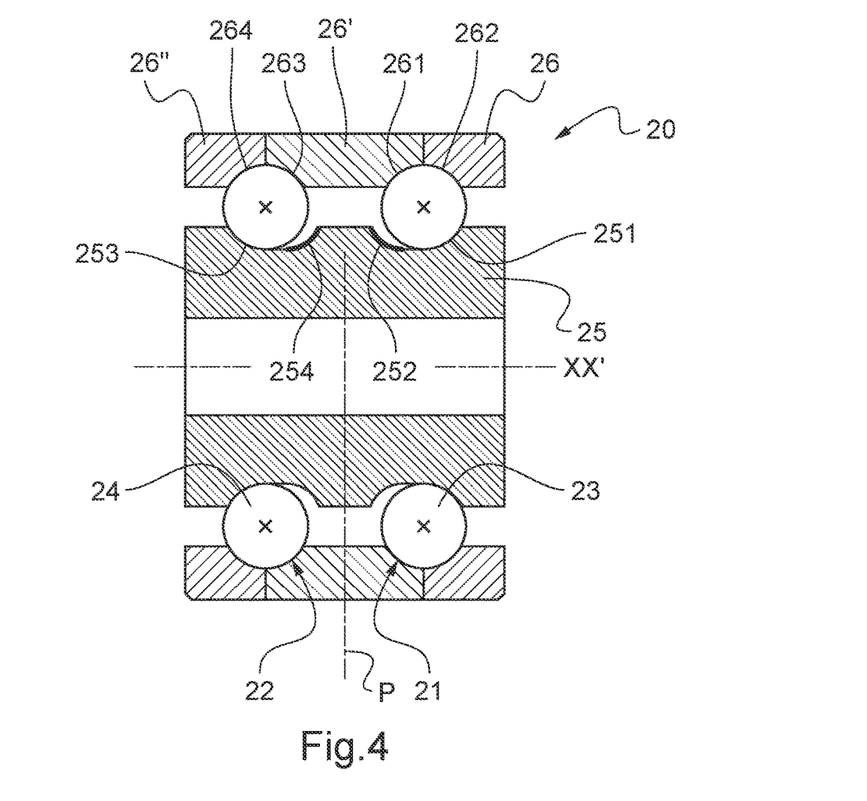
FIG. 4 is a transverse cross-sectional view of a second example of a bearing according to the invention in a nominal operating mode.

According to a second example of a ball bearing 20 shown in FIG. 4, which operates in a similar manner to the first example of a bearing 10, the at least one transmitting ring 25 may be a unitary component and the ball bearing 20 may be an O-type angular contact ball bearing.

In this example, the at least one receiving ring 26, 26', 26" comprises a first receiving ring 26, a second receiving ring 26' and a third receiving ring 26".

The transmitting ring 25 comprises a main transmitting raceway 251 in contact with the plurality of balls 13 of the first row 11 of balls in the nominal operating mode.

The second receiving ring 26' comprises a main receiving raceway 261 in contact with the plurality of balls 13 of the first row 11 of balls in the nominal operating mode.

The balls 13 of the first row 11 of balls therefore allow the first axial force or forces F1 to be transmitted from the first main transmitting raceway 251 to the first main receiving raceway 261.

In the nominal operating mode, the transmitting ring 25 comprises a second main transmitting raceway 253 coming into contact with the other plurality of balls 14 of the second row 12 of balls.

The second receiving ring 26' comprises another raceway 263 coming into contact with the other plurality of balls 14 of the second row 12 of balls in the nominal operating mode.

In the nominal operating mode of the bearing 20, the balls 14 of the second row 12 of balls therefore allow the second axial force or forces F2 to be transmitted from the second main transmitting raceway 253 to the second main receiving raceway 263.

In the degraded mode of the bearing 20 according to which at least one of the second transmitting 253 and/or receiving 263 raceways is worn, the second row 12 of balls no longer transmits axial force between the transmitting ring 25 and the second receiving ring 26'.

However, the transmitting ring 25 has a first secondary transmitting raceway 252 and the first receiving ring 26 has a first secondary receiving raceway 262. In the degraded operating mode and when the transmitting ring 25 is loaded by the second axial force or forces F2 oriented along the second axis AX2, the first secondary transmitting raceway 252 comes into contact with the balls 13 of the first row 11 of balls. The balls 13 of the first row 11 of balls then come into contact with the first secondary receiving raceway 262 in order to allow the bearing 20 to transmit the second axial force or forces F2.

Similarly, in the other degraded mode of the bearing 20 according to which at least one of the first transmitting 251 and/or receiving 261 raceways is worn, the first row 12 of balls no longer transmits axial force between the transmitting ring 25 and the second receiving ring 26'.

However, the transmitting ring 25 has a second secondary transmitting raceway 254 and the third receiving ring 26" has a second secondary receiving raceway 264. In the degraded operating mode and when the transmitting ring 25 is loaded by the first axial force or forces F1 oriented along the first axis AX1, the second secondary transmitting raceway 254 comes into contact with the balls 14 of the second row 12 of balls. The balls 14 of the second row 12 of balls then come into contact with the second secondary receiving raceway 264 in order to allow the bearing 20 to transmit the first axial force or forces F1.

According to other examples not shown here, the at least one transmitting ring may also comprise four transmitting rings and/or the at least one receiving ring may comprise two receiving rings, and vice versa.

Figure 5:
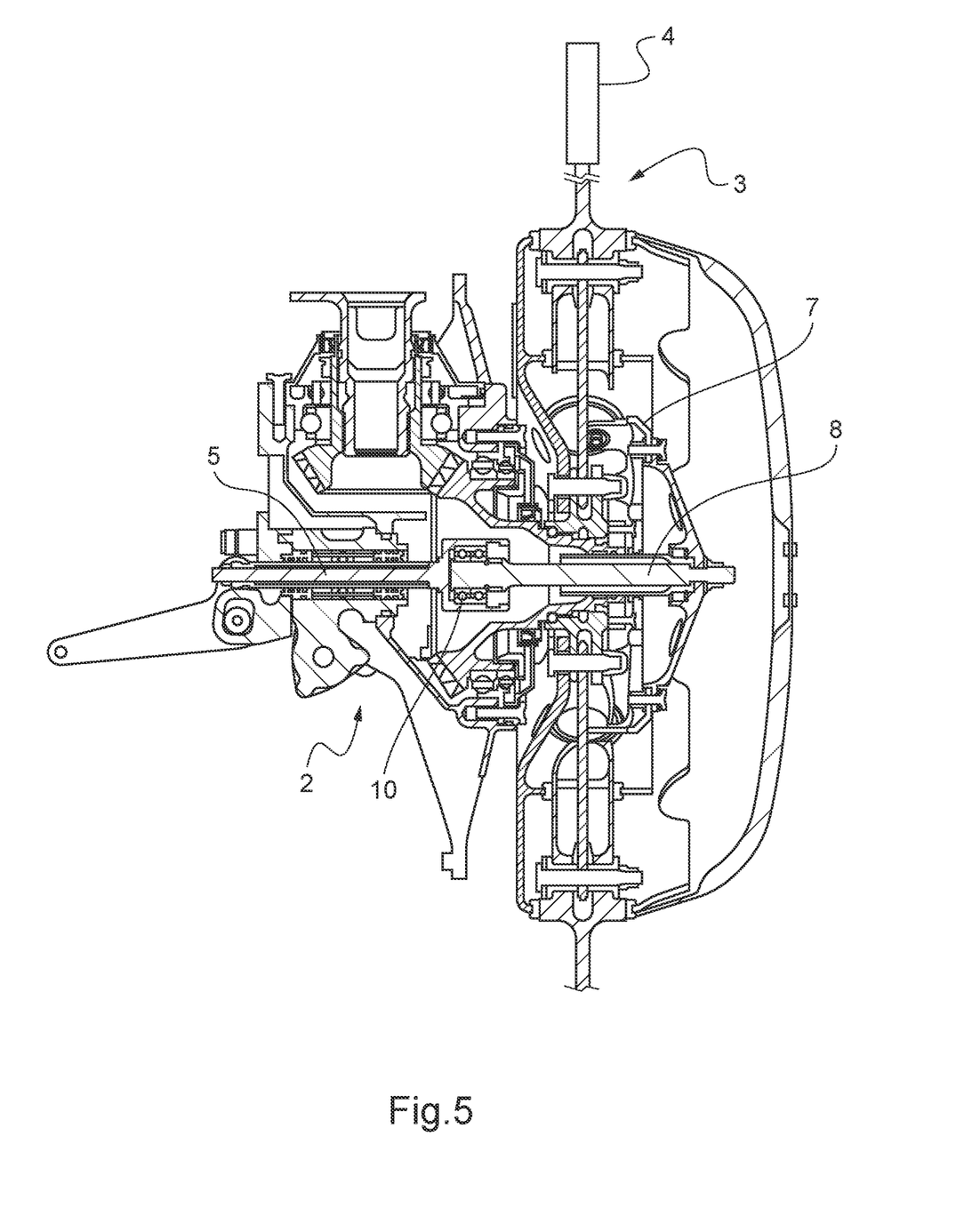
FIG. 5 is a transverse cross-sectional view of a gearbox according to the invention.

As shown in FIG. 5, the invention also relates to a gearbox 2 configured to transmit an engine torque to at least one rotor 3 provided with blades 4.

Such a gearbox 2 thus comprises a pitch control rod 5 integral in translation, for example, with the receiving ring 16 of a ball bearing 10 according to FIG. 1.

Figure 6:
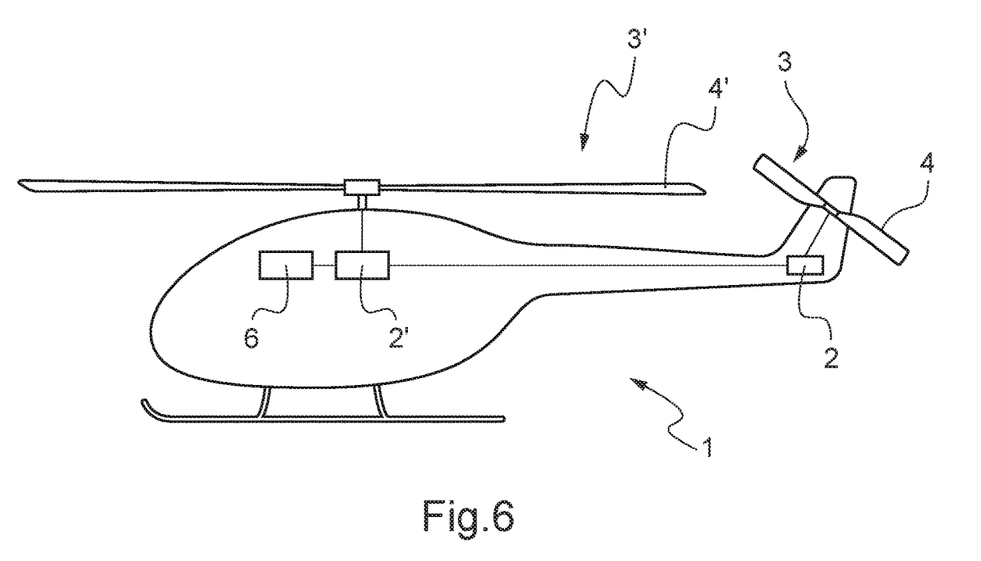
FIG. 6 is a cross-sectional diagram of an aircraft according to the invention.

As shown in FIG. 6, such a gearbox 2 allows an engine torque generated by at least one engine 6 to be transmitted to the rotor 3, and the pitch control rod 5 is mechanically connected to at least one pitch lever 7 controlling the pitch of the blades 4 of the rotor 3. The pitch control rod 5 therefore allows at least one axial force F1, F2 to be transmitted to one or more pitch levers 7. Each pitch lever 7 is articulated and secured, at a first end, with a blade 4 and, at a second end, with a pitch control shaft 8 secured to the at least one transmitting ring 15, 15', 15".

These various pitch levers 7 may therefore allow the pitch of these blades 4 to be modified collectively via a pitch control shaft secured to the at least one transmitting ring 15, 15', 15".

Moreover, an aircraft 1 comprises at least one rotor 3, 3' provided with blades 4, 4' and one or more engines 6. As shown in FIG. 6, the rotor 3 may be a rear rotor of a rotorcraft making it possible, in particular, to control the yaw movements of the aircraft, and the rotor 3' is a main rotor of this rotorcraft contributing at least to its lift in the air.

The aircraft 1 also comprises an auxiliary gearbox 2 and a main gearbox 2'.

An engine torque generated by the engine 6 may therefore be transmitted to the rotors 3, 3' and at least one axial force F1, F2 may be transmitted from the pitch control rod 5 to at least one pitch lever 7.

Figure 7:
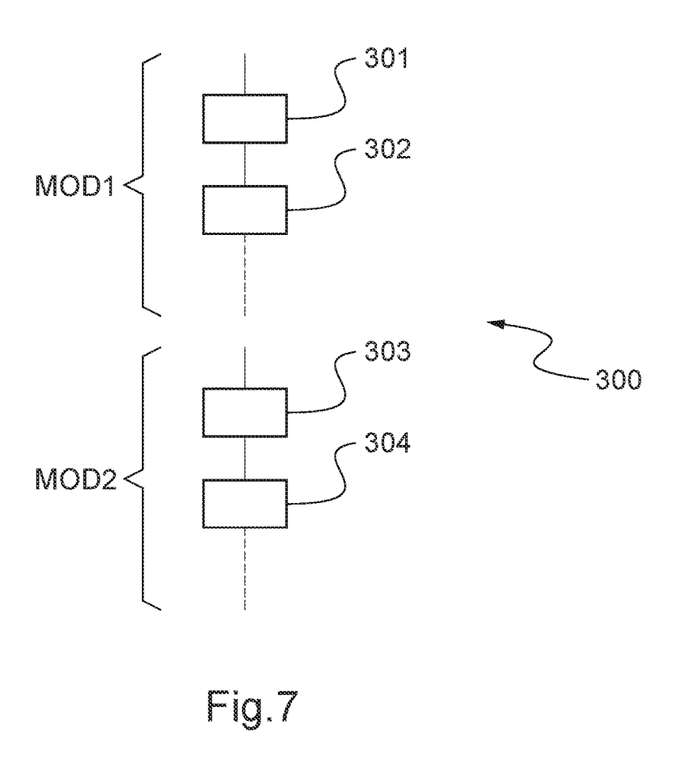
FIG. 7 is a logic diagram representing a method for transmitting at least one axial force according to the invention.

As shown in FIG. 7, the invention also relates to a method 300 for transmitting at least one axial force F1, F2 by means of an angular contact ball bearing 10, 20 as previously described.

Such a method 300 thus comprises at least one nominal operating mode MOD1 of the ball bearing 10, 20.

In this nominal operating mode MOD1, the method 300 comprises at least one transmission 301 of at least one first axial force F1 through the first row 11, 21 of balls, this or these first axial forces F1 being oriented along the first axis AX1 from the at least one transmitting ring 15, 15', 15", 25 to the at least one receiving ring 16, 26, 26', 26".

Next, in another temporal phase of the nominal operating mode MOD1, the method 300 comprises at least one opposing transmission 302 of at least one second axial force F2 through the second row 12, 22 of balls, this or these second axial forces F2 being oriented along the second axis AX2, opposite the first axis AX1, from the at least one transmitting ring 15, 15', 15", 25 to the at least one receiving ring 16, 26, 26', 26".

The transmission 301 and the opposing transmission 302 are thus implemented several times one after the other in alternation in the nominal operating mode MOD1.

However, in a degraded operating mode MOD2 of the bearing 10, 20, the method 300 comprises at least one transmission 303 of the first axial force or forces F1 through the first row 11, 21 of balls oriented along the first axis AX1.

Next, in another temporal phase of the degraded operating mode MOD2, the method 300 comprises at least one opposing transmission 304 of the second axial force or forces F2 through the first row 11, 21 of balls oriented along the second axis AX2.

The transmission 303 and the opposing transmission 304 may thus be implemented several times one after the other in alternation in the degraded operating mode MOD2.

Moreover, such a degraded operating mode MOD2 corresponds to a degradation of at least one second main transmitting raceway 153, 253 of the at least one transmitting ring 15, 15', 15", 25 or of the at least one receiving ring 16, 26, 26', 26" coming into contact with the balls 14, 24 of the second row 12, 22 of balls.

Naturally, the present invention is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present invention.

What is claimed is:

1. A gearbox configured to transmit an engine torque to at least one rotor provided with blades,
    wherein the gearbox comprises:
    an angular contact ball bearing comprising a first row of balls provided with a plurality of balls, a second row of balls provided with another plurality of balls; and
    a pitch control rod integral in translation with at least one receiving ring of the ball bearing, and
    wherein, in a nominal operating mode of the ball bearing:
    the first row of balls transmits at least one first axial force oriented along a first axis from at least one transmitting ring to the at least one receiving ring of the ball bearing; and
    the second row of balls transmits at least one second axial force oriented along a second axis, opposite the first axis, from the at least one transmitting ring to the at least one receiving ring,
    in a degraded operating mode of the ball bearing, the first row of balls is configured to transmit the at least one first axial force oriented along the first axis and the at least one second axial force oriented along the second axis, the second row of balls transmitting no axial force, the degraded operating mode corresponding to a degradation of at least one raceway of the at least one transmitting ring or of the at least one receiving ring initially coming into contact with the other plurality of balls of the second row of balls in the nominal operating mode, and
    wherein, to either side of a first transverse plane passing through centers of the balls of the first row of balls, the at least one transmitting ring comprises a first main transmitting raceway in contact with the plurality of balls of the first row of balls in the nominal operating mode and a first secondary transmitting raceway, the first secondary transmitting raceway being separated from the first row of balls by a first predetermined non-zero operating clearance in the nominal operating mode, the first secondary transmitting raceway being in contact with the plurality of balls of the first row of balls in the degraded operating mode when the at least one transmitting ring is loaded by the at least one second axial force oriented along the second axis, and
    wherein, to either side of a second transverse plane passing through centers of the balls of the second row of balls, the at least one transmitting ring comprises a second main transmitting raceway in contact with the plurality of balls of the second row of balls in the nominal operating mode and a second secondary transmitting raceway, the second secondary transmitting raceway being separated from the second row of balls by a second predetermined non-zero operating clearance in the nominal operating mode, the second secondary transmitting raceway being in contact with the plurality of balls of the second row of balls in the degraded operating mode when the at least one transmitting ring is loaded by the at least one first axial force oriented along the first axis, the first predetermined operating clearance being equal to the second predetermined operating clearance and between 0.1 mm (millimeter) and 0.5 mm (millimeter).

2. The gearbox according to claim 1,
    wherein the first secondary transmitting raceway and the second secondary transmitting raceway are arranged symmetrically with respect to a median plane of symmetry of the ball bearing.

3. The gearbox according to claim 1,
    wherein the at least one transmitting ring comprises a first transmitting ring provided with the first main transmitting raceway and a second transmitting ring provided with the first secondary transmitting raceway.

4. The gearbox according to claim 3,
    wherein, the at least one transmitting ring comprising the second main transmitting raceway in contact with the plurality of balls of the second row of balls in the nominal operating mode, the at least one transmitting ring comprises a third transmitting ring provided with the second main transmitting raceway coming into contact with the other plurality of balls of the second row of balls in the nominal operating mode, the second transmitting ring being provided with the second secondary transmitting raceway.

5. The gearbox according to claim 1,
    wherein the at least one receiving ring is a unitary component.

6. The gearbox according to claim 1,
    wherein the at least one transmitting ring is a unitary component.

7. The gearbox according to claim 1,
    wherein, the at least one transmitting ring being a unitary component, the at least one receiving ring comprises a first receiving ring provided with a first secondary receiving raceway and a second receiving ring provided with a first main receiving raceway.

8. The gearbox according to claim 7,
wherein the at least one receiving ring comprises a third receiving ring provided with a second secondary receiving raceway, the second receiving ring being provided with a second main receiving raceway.

9. An aircraft comprising at least one rotor provided with blades and at least one engine,
wherein the aircraft comprises a gearbox according to claim 1, the gearbox transmitting an engine torque generated by the at least one engine to the at least one rotor, the pitch control rod being mechanically connected to at least one pitch lever controlling the pitch of the blades of the at least one rotor.

\* \* \* \* \*